United States Patent

Maeda

[11] Patent Number: 5,934,416
[45] Date of Patent: Aug. 10, 1999

[54] FLOATING CALIPER-DISC TYPE BRAKE

[76] Inventor: Hiroyuki Maeda, 49-7-608, Naritahigashi 1-chome, Suginami-ku, Tokyo 166, Japan

[21] Appl. No.: 09/140,877

[22] Filed: Aug. 27, 1998

Related U.S. Application Data

[62] Division of application No. 08/813,837, Mar. 6, 1997, which is a continuation of application No. 08/505,530, Jul. 28, 1995, abandoned.

[30] Foreign Application Priority Data

Sep. 7, 1994 [JP] Japan .................................... 6-239517
Mar. 8, 1995 [JP] Japan .................................... 7-77262

[51] Int. Cl.⁶ .............................................. F16D 55/224
[52] U.S. Cl. .................. 188/71.8; 188/73.45; 188/196 P
[58] Field of Search ................. 188/71.8, 73.1, 188/73.3, 73.31, 73.43, 73.45, 71.7, 196 P

[56] References Cited

U.S. PATENT DOCUMENTS

| 3,575,268 | 4/1971 | Yokohama | 188/196 |
|---|---|---|---|
| 4,279,331 | 7/1981 | Lüpertz | 188/73.3 |
| 4,311,219 | 1/1982 | Watanabe et al. | 188/71.8 |
| 4,436,186 | 3/1984 | Ritsema et al. | 188/71.8 |
| 4,475,632 | 10/1984 | Feldmann et al. | 188/71.4 |
| 5,325,940 | 7/1994 | Rueckert et al. | 188/71.8 |

FOREIGN PATENT DOCUMENTS

| 0 092 896 | 2/1983 | European Pat. Off. . |
|---|---|---|
| 3247052 | 6/1984 | Germany . |
| 4203318 | 8/1993 | Germany . |
| 55-181037 | 6/1954 | Japan . |
| 47-39880 | 10/1972 | Japan . |
| 56-28328 | 3/1981 | Japan . |
| 6-32773 | 4/1994 | Japan . |
| 2117464 | 10/1983 | United Kingdom . |

*Primary Examiner*—Matthew C. Graham
*Attorney, Agent, or Firm*—Flynn, Thiel, Boutell & Tanis, P.C.

[57] ABSTRACT

A floating caliper-disc type brake is capable of defining a second gap between a disc and an outer pad when the same brake is released, preventing a dragging torque from being generated during the traveling of a vehicle, improving fuel consumption of the vehicle, and solving a jar generated when the outer pad is slid with respect to the disc. The floating caliper-disc type brake comprises an elastic member interposed between a support and a caliper and being gradually varied in retaining position thereof with respect the support and caliper depending on wearing amount of the outer pad, wherein when the brake is applied, the caliper is moved in the other direction while elastically deforming the elastic member within deformable amount of said elastic member, and when the brake is released, the caliper is moved in one direction by a second length which is smaller than a first length owing to elastic deformation of the elastic member so as to define a first gap between the disc and an inner pad and a second gap between the disc and the outer pad.

20 Claims, 7 Drawing Sheets

FLOATING CALIPER-DISC TYPE BRAKE

This application is a divisional of U.S. Ser. No. 08/813,837, filed Mar. 6, 1997, which is a continuation of U.S. Ser. No. 08/505,530, filed Jul. 28, 1995, now abandoned.

BACKGROUND OF THE INVENTION

1. Field of the Invention

The present invention relates to a floating caliper-disc type brake.

2. Related Art

A floating caliper-disc type brake comprises a support fixed to non-rotatable portion of a vehicle, a caliper floatably supported by the support and an inner pad to be brought into contact with a piston which is slidably engaged in a cylinder formed in a rear arm of the caliper, an outer pad supported by a front arm of the caliper, wherein a disc rotating together with a wheel is clamped by the inner and outer pads to generate a breaking torque. In the disc brake of this type, a gap between the disc and each pad, when the brake is released, is assured in the following manner. That is, a seal ring composed of rubber elastic body is interposed between the cylinder and the piston, wherein when the brake is applied, the piston is allowed to move in one direction to protrude from the cylinder owing to elastic deformation of the seal ring, and when the brake is released, the piston is moved in the other direction to return to be pushed into the cylinder owing to elastic restoration to the original form of the seal ring. When both pads are worn, the seal ring is gradually varied in its retaining position with respect to the piston depending on wearing amount of both pads so that the piston is gradually moved in one direction to protrude from the cylinder. Consequently, amount of depression of a brake pedal, namely, amount of brake operating liquid is kept constant and a given gap is defined between the disc and the inner pad. When the outer pad is kicked back by the rotating disc, the outer pad is moved together with the caliper so as to be kept away from the disc, thereby defining a gap between the disc and the outer pad, at the time of release of the brake. At this time, caliper slightly floats relative to the support.

However, in such a conventional floating caliper-disc type brake, a given gap between the disc and the inner pad is surely defined by the elastic deformation of the seal ring. However, there is a tendency that a gap between the disc and the outer pad is not surely defined. Accordingly, dragging torque is always generated when the outer pad is slid with respect to the disc during the traveling of the vehicle, which causes the problems of increase of fuel consumption of the vehicle and generation of different noise (jar) involved in sliding of the outer pad with respect to the disc. The more the manufacturing and attaching accuracy is improved, the more such problem occur.

SUMMARY OF THE INVENTION

The present invention is made to solve the aforementioned problems of the conventional floating caliper-disc type brake and to provide a floating caliper-disc type brake comprising as follows.

The floating caliper-disc type brake according to a first aspect of the invention comprises a support 4 fixed to non-rotatable portion of a vehicle, a caliper 5 floatably supported by the support 4 and having rear and front arms 5a and 5b, an inner pad 10 to be pushed by a piston 8, the piston 8 being slidably engaged in a cylinder 6 formed in the rear arm 5a of the caliper 5, an outer pad 14 supported by the front arm 5b of the caliper 5, at least one seal ring 12 which is interposed between the cylinder 6 and the piston 8 and is fixed to the rear arm 5a, and is retained slidably on a peripheral surface of the piston 8 wherein the retaining position is gradually varied depending on wearing amount of the inner and outer pads 10 and 14, wherein when the brake is applied, the piston 8 is pushed out from the cylinder 6 in one direction while elastically deforming the seal ring 12 within deformable amount of the seal ring 12, and the caliper 5 is moved to the other direction with respect to the support 4, so that the inner and outer pads 10 and 14 clamps a disc 1 rotating together with a wheel so as to generate braking torque, and wherein when the brake is released, the piston 8 is moved in the other direction by a first length $L_1$ to be pushed into the cylinder 6 owing to elastic deformation of the seal ring 12 so as to define a gap between the disc 1 and the inner pad 10, the disc brake being characterized in further comprising an elastic member 18; or elastic members 28a; 28b interposed between the support 4 and the caliper 5 and being gradually varied in retaining position depending on wearing amount of the outer pad 14, wherein when the brake is applied, the caliper 5 is moved in the other direction while elastically deforming the elastic member 18 (28a, 28b) within deformable amount of the elastic member 18 (28a, 28b), and wherein when the brake is released, the caliper 5 is returned in one direction by a second length $L_2$ which is smaller than the first length $L_1$ owing to elastic restoration of the elastic member 18 (28a, 28b) so as to define a first gap $\Delta$ between the disc 1 and the inner pad 10 and a second gap $\delta$ between the disc 1 and the outer pad 14.

A floating caliper-disc type brake according to a second aspect of the invention includes a two pot type cylinder 6.

A floating caliper-disc type brake according to a third aspect of the invention includes dual wheels.

A floating caliper-disc type brake according to a fourth aspect of the invention includes a plurality of elastic members 18 (28a, 28b).

A floating caliper-disc type brake according to a fifth aspect of the invention includes a plurality of elastic members 18 (28a; 28b) which are arranged at both sides of the caliper in a peripheral direction of the disc 1.

A floating caliper-disc type brake according to a sixth aspect of the invention includes a direct active type bearing 24 interposed between the support 4 and the caliper 5 for supporting floating of the caliper 5.

A floating caliper-disc type brake according to a seventh aspect of the invention includes a plurality of direct active type bearings 24 which are interposed between the support 4 and the caliper 5 at both sides of the caliper 5 in a peripheral direction of said disc 1.

According to the first aspect of the invention, when the piston 8 is moved to protrude from the cylinder 6 when the brake is applied, the inner pad 10 is pressed against one side surface of the disc 1 to generate repulsive force by which the caliper 5 is moved in the other direction so that the outer pad 14 is pressed against the other side surface of the disc 1. At this time, the elastic member 18 (28a, 28b) are elastically deformed by the second length $L_2$. When the outer pad 14 is worn in an amount exceeding a given amount, a relative moving amount of the caliper 5 with respect to the support 4 exceeds a given amount or length, retaining position of the elastic member 18 (28a, 28b) with respect to the support 4 or the caliper 5 is gradually varied depending on the wearing amount of the outer pad 14. On the other hand, when both pads 10 and 14 are worn in an amount exceeding the given amount, retaining position of the seal ring 12 with respect to the piston 8 (or caliper 5) is gradually varied depending on the wearing amount.

Successively, when the brake is released, the seal ring 12 is elastically restored to the original form (hereinafter referred to as simply elastically restored) so that the piston 8 is moved in the other direction to return to the original position (hereinafter referred to as simply as moved to return) by the first length $L_1$ so that a gap is defined between the inner pad 10 and one side surface of the disc 1. At the same time, the retained elastic member 18 (28a, 28b) are elastically restored. Accordingly, the caliper 5 is moved to return in one direction by the second length $L_2$ so that a second gap δ is defined between the outer pad 14 and the disc 1. The second gap δ is equal to the second length $L_2$ which is elastic restoration amount of the elastic member 18 (28a, 28b).

The second length $L_2$ by which the caliper 5 is moved to return when the brake is released is set to be smaller than the first length $L_1$ regardless of the wearing amount of the outer pad 14. Accordingly, the first gap Δ is surely defined between the inner pad 10 and the disc 1 in a state where the second gap δ is defined between the outer pad 14 and the disc 1, thereby satisfactorily prevent dragging of the disc 1 into both pads 10 and 14.

According to the fourth aspect of the invention, an excellent elastic restoration can be obtained by a plurality of elastic members 18 (28a, 28b).

According to the fifth aspect of the invention, an excellent elastic restoration by a plurality of elastic members 18 (28a, 28b) can be obtained at both sides of said caliper 5 in a peripheral direction of said disc 1. Accordingly, the caliper 5 can be smoothly moved to return with respect to the support 4 by the length $L_2$.

According to the sixth aspect of the invention, the floating movement of the caliper 5 with respect to the support 4 can be performed smoothly by a direct active type bearing 24. Accordingly, the caliper 5 can be moved to return in one direction by the exact second length $L_2$ owing to the elastic restoration amount of the elastic member 18 (28a, 28b). As a result, the second gap δ can be surely defined between the outer pad 14 and the disc 1 when the brake is released.

According to the seventh aspect of the invention, the caliper 5 can be moved to return more smoothly with respect to the support 4.

DESCRIPTION OF THE PREFERRED EMBODIMENT

First Embodiment (FIGS. 1 to 6)

Figure 1:
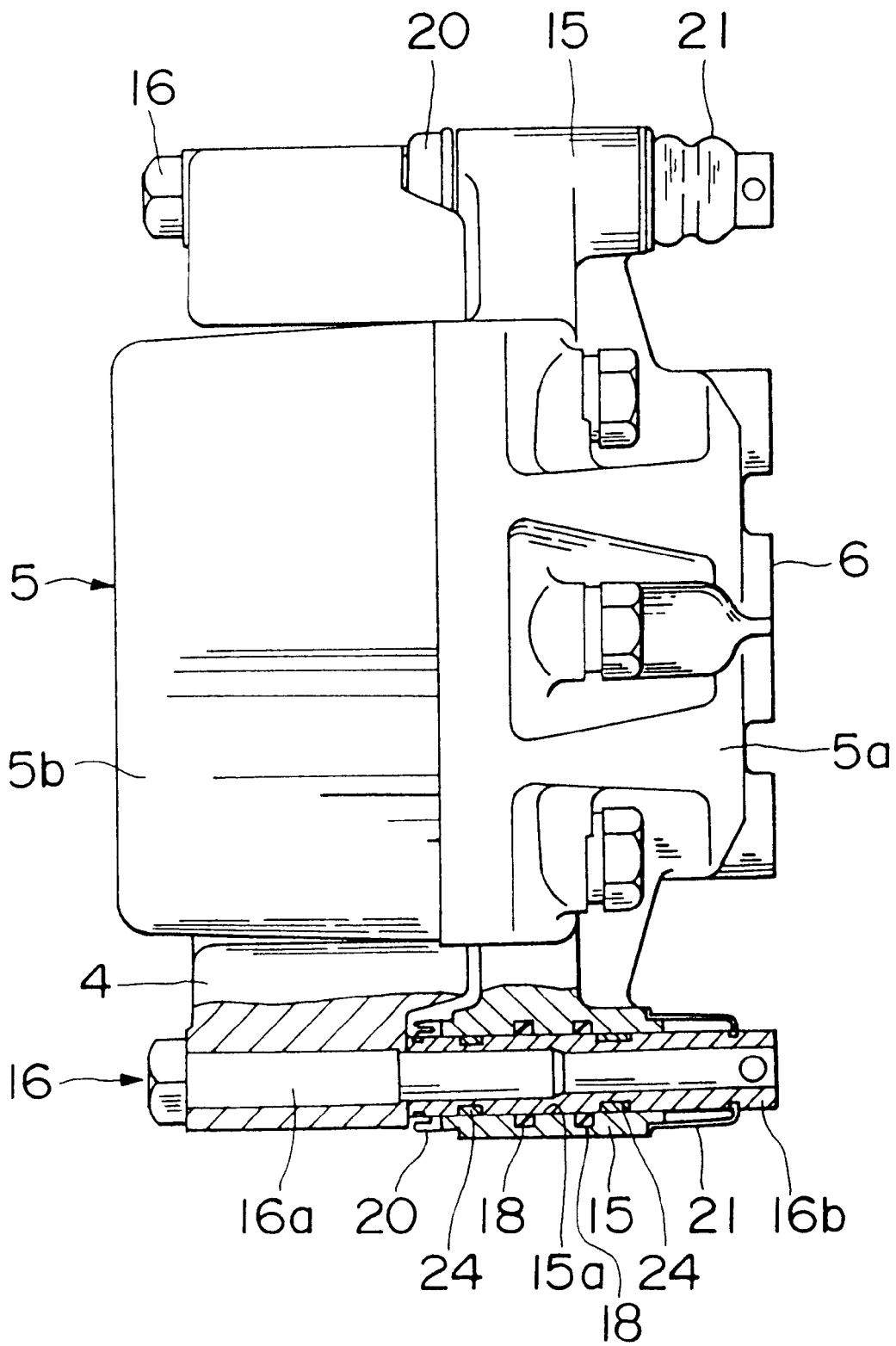
FIG. 1 is a of view showing a floating caliper-disc type brake according to a first embodiment of the present invention in which a part of the floating caliper-disc type brake is cut away.

A floating caliper-disc type brake according to a first embodiment of the present invention will be described now with reference to FIGS. 1 to 6.

In FIGS. 1 to 6, a discoidal disc 1 is fixed to a rotatable member of a vehicle such as a wheel hub, a flange of an axle shaft which is rotated together with a wheel, not show, by way of bolts and nuts. The wheel includes not only a single wheel but also dual wheels comprising a pair of wheels.

A support 4 is firmly fixed to a non-rotatable portion of the vehicle such as a knuckle and an axle tube, not shown. A caliper 5 bridging over the disc 1 is supported by the support 4 to float (hereinafter referred to as floatably supported) in one direction (in a direction of axis of rotation of the disc 1, i.e. to the left and right in FIG. 1). A cylinder 6 is provided in a rear arm 5a of the caliper 5 (at one end of the caliper 5 in a direction of axis of rotation of the disc 1). The caliper 5 is guided by a pair of pins 16 and moved in a direction of axis of rotation of the disc 1 since the pair of pins 16 are arranged in parallel with the support 4 and floatably engaged in holes 15a of ears 15 provided at both sides of the caliper 5 in a rotating direction (peripheral direction) of the disc 1. The cylinder 6 may be formed of a two pot type.

Figure 2:
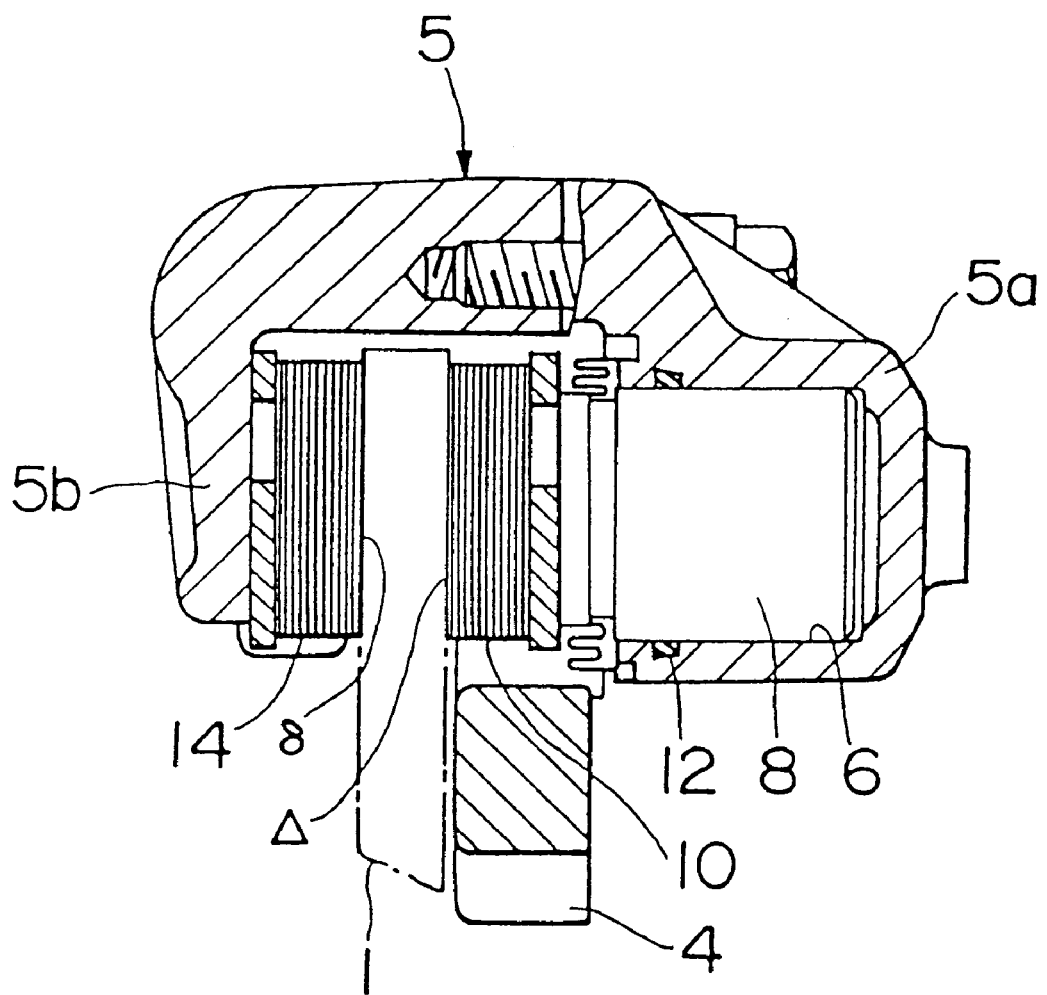
FIG. 2 is a cross-sectional view of the floating caliper-disc type brake of FIG. 1.
Figure 3:
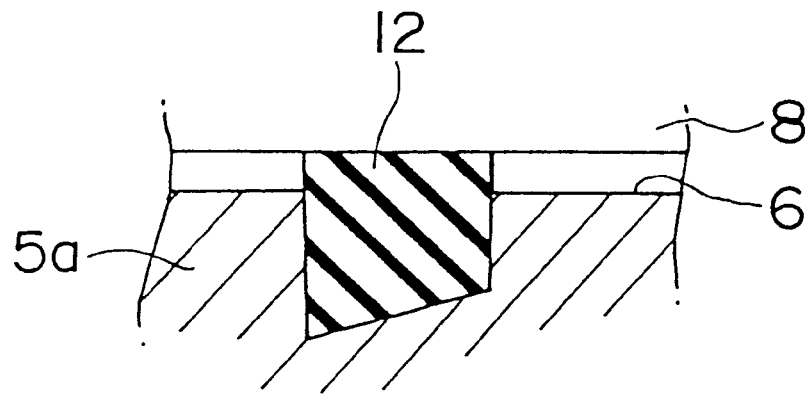
FIG. 3 is a cross-sectional view of a seal ring of the floating caliper-disc type brake of FIG. 1.
Figure 4:
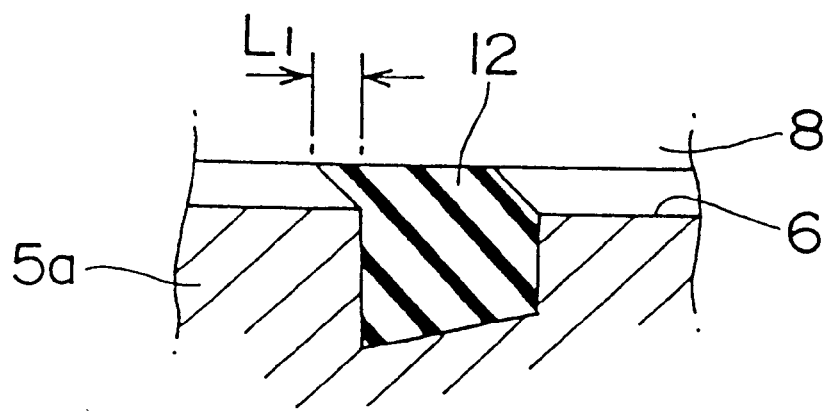
FIG. 4 a view for explaining the seal ring of the floating caliper-disc type brake of FIG. 1.

A piston 8 is engaged in the cylinder 6 provided in the rear arm 5a of the caliper 5 so as to slide in the direction of axis of rotation of the disc 1 by way of a seal ring 12 as shown in FIGS. 2 to 4. It is a matter of course that a plurality of seal rings may be provided to obtain the same function. An inner pad 10 is brought into contact with the piston 8 so as to be pushed by the piston 8. An outer pad 14 is brought into contact with and supported by a front arm 5b of the caliper 5 (other end of the caliper 5 in the direction of axis of rotation of the disc 1). The outer pad 14 may be integrally attached to the front arm 5b by way of a detachable coupling means such as a bolt. When a brake pedal is depressed, namely, the brake is applied, the piston 8 is protruded, namely, pushed out from the cylinder 6 in one direction while elastically deforming the seal ring 12 within deformable amount of the seal ring 12 so that the disc 1 is clamped by the inner pad 10 and the outer pad 14 as shown in FIG. 4, whereby a braking torque is generated in the inner and outer pad 10 and 14. When the brake pedal is released, namely, the brake is released, the piston 8 is moved to return by a first length $L_1$ owing to elastic deformation of the seal ring 12 as shown in FIG. 4, so that a first gap Δ, described later is defined between the disc 1 and the inner pad 10 as shown in FIG. 2.

Each of a pair of pins 16 fixed to the support 4 comprises, as shown in FIG. 1, an axle member 16a penetrating the support 4 and a bush 16b fixed to the axle member 16a, wherein the hole 15a of the ear 5 of the caliper 5 floats relative to the outer peripheral surface of the bush 16b. A pair of direct active type bearings 24 (linear motion bearings) are interposed between the bush 16b and the hole 15a respectively at a portion where the hole 15a moves relative to the bush 26 so as to reduce a moving resistance of the caliper 5 with respect to the support 4, thereby allowing the caliper 5 to move smoothly. Denoted at 20 and 21 are sealing boots for respectively covering each end portion of the ear 15 of the caliper 5 and of the bushes 16b.

Figure 5:
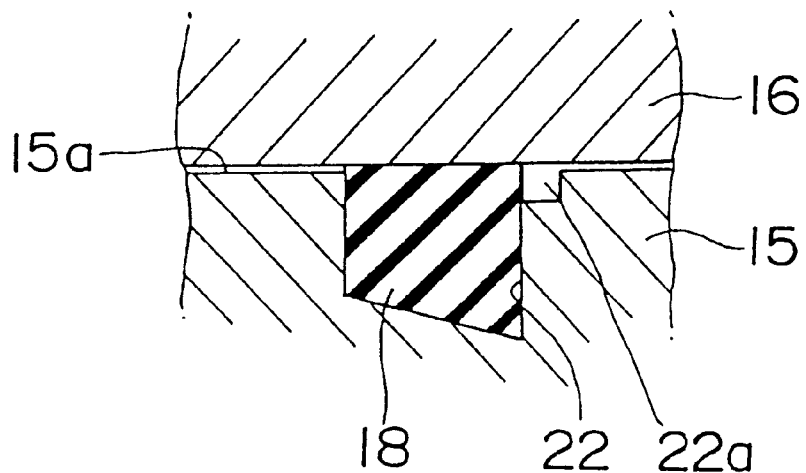
FIG. 5 is a cross-sectional view of an elastic member of the floating caliper-disc type brake of FIG. 1.
Figure 6:
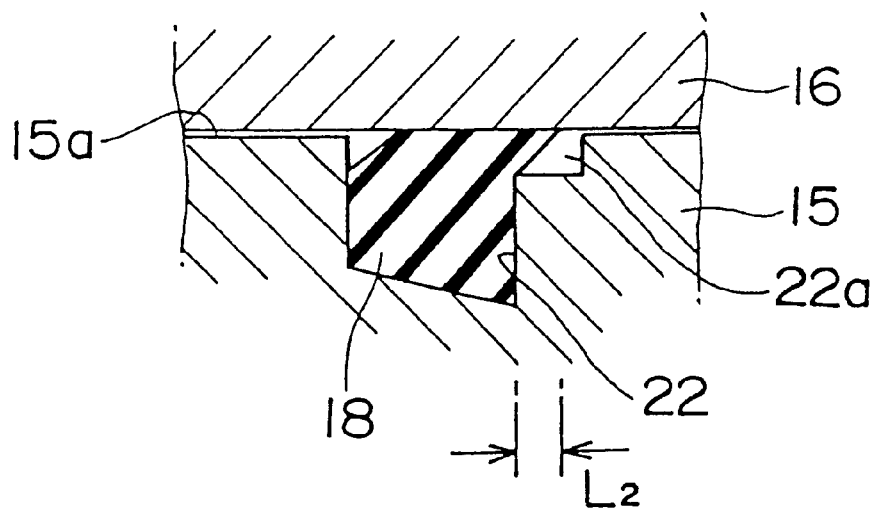
FIG. 6 a view for explaining the elastic member of the floating caliper-disc type brake of FIG. 1.

Each elastic member 18 is interposed in each pin 16 of the support 4, namely, between each bush 16b and each ear 15 of the caliper 5 and disposed at a position avoiding a direct active type bearing 24 as shown in FIGS. 1 and 5. In particular, the elastic member 18 is interposed between the opposing surfaces of the support 4 and the caliper 5 which surfaces respectively extend in floating directions. The elastic member 18 is formed annularly and made of a rubber elastic body (rubber or elastomer) and a plurality of elastic members 18 are disposed in each pin 16. When the brake is applied, the elastic member 18 allows the caliper 5 to move in the other direction while it is deformed within deformable amount of the elastic member 18. When the brake is released, the elastic member 18 allows the caliper 5 to move to return in one direction. Namely, when the brake is released, the elastic member 18 is elastically restored from a state as shown in FIG. 6 so as to allow the caliper 5 to move in one direction, namely, to return the caliper 5 in one direction by a second length $L_2$ so that a second gap $\delta$ is defined between the disc 1 and the outer pad 14 as shown in FIG. 2 in a state where the brake is released. On the other hand, when the outer pad 14 is worn, the caliper 5 is largely moved in the other direction depending on wearing amount of the outer pad 14 when the brake is applied so that a close retaining or contact position of the elastic member 18 with respect to the pin 16 is gradually varied.

More in detail, as shown in FIGS. 1 and 5, a plurality of annular grooves 22 are defined in the ears 15 of the caliper 5 and an outer periphery of the elastic member 18 is embedded into each annular groove 22, and then an inner peripheral surface of each elastic member 18 is elastically brought into contact with an outer peripheral surface of each pin 16. A shallow annular groove portion 22a is defined in the inner periphery of the annular groove 22 as shown in FIG. 5, wherein the elastic member 18 is allowed to be elastically deformed in the shallow annular groove portion 22a and floating of the caliper 5 is performed precisely at the side of the hole 15a. Elastic restoration amount of the elastic member 18, namely, the second length $L_2$ by which the caliper 5 is moved in one direction is set to be smaller than the first length $L_1$ which is elastic restoration amount of the seal ring 12, namely, the second length $L_2$ is set to be one fifth to four fifths of the first length $L_1$ and is preferable to be set to be the half of the first length $L_1$. A plurality of elastic members 18 are disposed between each pin 16 and the ear 15 of the caliper 5 in the direction of axis of rotation of the disc 1 so as to generate a large elastic restoring force depending on the weight of the caliper 5. If the caliper 5 can be moved to return in one direction, or single elastic member 18 alone can be disposed in each pin 16.

An operation of the first embodiment will be described now.

When a brake pedal, not shown, is depressed so as to supply liquid under pressure (brake operating liquid) during traveling of the vehicle, the inner pad 10 together with the piston 8 is pushed out from the cylinder 6 so that the inner pad 10 is pressed against one side surface of the disc 1 which rotates together with the wheel. At that time, the seal ring 12 is elastically deformed by the first length $L_1$. When both pads 10 and 14 are worn by the amount exceeding a given amount, the piston 8 is moved with respect to the seal ring 12 depending on the wearing amount. Accordingly, a returning length of the piston 8 is always equal to the first length $L_1$ which is an elastic restoration amount of the seal ring 12.

On the other hand, when the inner pad 10 is pressed against the disc 1 to generate repulsive force by which the caliper 5 is moved in the other direction by repulsive force so that the outer pad 14 which is brought into contact with the front arm 5b is pressed against the other side surface of the disc 1. At the same time when the caliper 5 is moved, the hole 15a floats with respect to each pin 16, whereby the disc 1, i.e., the wheel is braked. A braking torque generated in both pads 10 and 14 is directly transmitted to the support 4 (or by way of the caliper 5 and pin 16) so that the inner pad 10 and outer pad 14 are normally supported by the support 4.

Since the hole 15a floats with respect to each pin 16 when the brake is applied, each elastic member 18 is deformed by the second length $L_2$ as shown in FIG. 6. When the outer pad 14 is worn by an amount exceeding a given amount, relative moving amount between the pin 16 and the hole 15a largely exceeds a given amount so that the caliper 5 and elastic member 18 are moved in the other direction with respect to each pin 16, whereby a retaining position of each elastic member 18 with respect to each pin 16 is gradually varied depending on the wearing amount of the outer pad 14.

Successively, when the brake is released by discharging the liquid under pressure from the cylinder 6, the seal ring 12 is elastically restored so that the piston 8 is moved to return in the other direction by the first length $L_1$, so as to be pushed into the cylinder 6 thereby defining a gap between the inner pad 10 and one side surface of the disc 1. At the same time, each elastic member 18 is elastically restored. As a result, the caliper 5 is moved to return in one direction by the second length $L_2$ so as to define the second gap $\delta$ between the outer pad 14 and the disc 1. The second gap $\delta$ is equal to the second length $L_2$ which is the elastic restoration amount of the elastic member 18. Since the direct active type bearing 24 is interposed between the bush 16b and the hole 15a, the caliper 5 is smoothly floatably moved with respect to the support 4, without generating moving resistance based on the elastic restoration of each elastic member 18, thereby assuring the returning of the caliper 5 by the second length $L_2$.

The second length $L_2$ by which the caliper 5 is moved to return in one direction when the brake is released is set to be smaller than the first length $L_1$. In a state where the second gap $\delta$ is defined between the outer pad 14 and the disc 1 when the brake is released, the first gap $\Delta$ is defined between the inner pad 10 and the disc 1 with assurance so that the disc 1 is prevented from being dragged in both inner pad 10 and outer pad 14. If the second length $L_2$ is set to be one fifth to four fifths of the first length $L_1$, the first and second gaps $\Delta$ and $\delta$ are suitably defined to prevent the disc 1 from being dragged in both inner pad 10 and outer pad 14. If the second length $L_2$ is set to be the half of the first length $L_1$, the first and second gaps $\Delta$ and $\delta$ are defined by the same length so as to satisfactorily prevent the disc 1 from being dragged in both inner pad 10 and outer pad 14. Even if the elastic member 18 is fixed to each pin 16 at the inner periphery thereof and it is brought into contact with or retained by the hole 15a of the caliper 5 at the outer periphery thereof, the same function is obtained.

Figure 7:
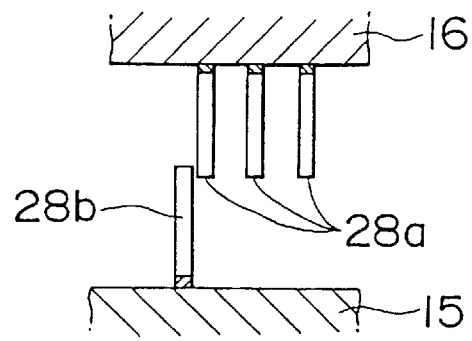
FIG. 7 is a cross-sectional view of elastic members according to a second embodiment of the present invention.
Figure 8:
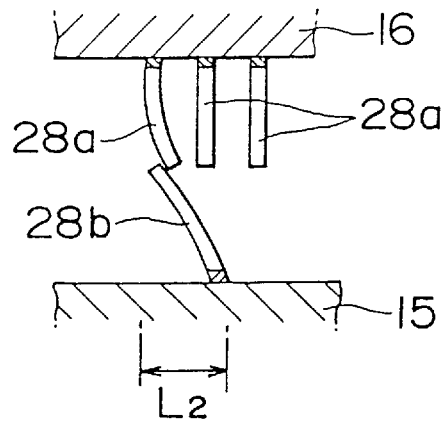
FIG. 8 a view for explaining the elastic member of FIG. 7.
Figure 9:
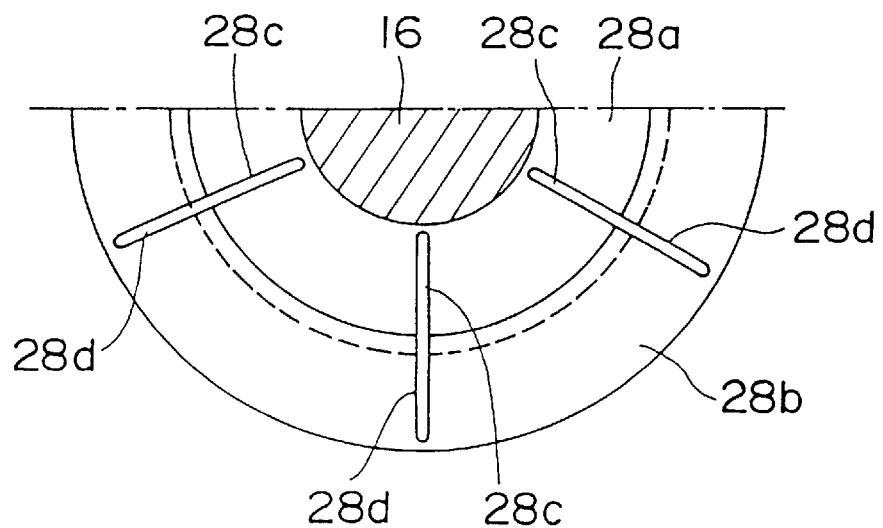
FIG. 9 is a view of the elastic members of FIG. 7 which are halved.

Second Embodiment (FIGS. 7 to 9)

A floating caliper-disc type brake according to a second embodiment will be described with reference to FIGS. 7 to 9. The second embodiment as well as third and fourth embodiments, described later, are substantially the same as the first embodiment except elastic members, and other elements of the second to fourth embodiments are the same as those of the first embodiment, and hence numerals denoted at those elements are denoted at the same numerals. That is, the second to fourth embodiments relate to first to third modifications of the structure of the elastic member.

FIGS. 7 to 9 show an example of a first modification of a structure of the elastic member. Elastic members 28a and 28b disposed between each pin 16 of the support 4 and the hole 15a of the ear 15 of the caliper 5 are respectively made of spring steels. It is possible to use elastic members 28a and 28b instead of a rubber elastic material since they are not necessary to perform liquid sealing between each pin 16 and each ear 15 of the caliper 5. Elastic members 28a are respectively fixed to each pin 16 of the support 4 in a given interval and a single elastic member 28b is fixed to the ear 15 of the caliper 5. The elastic members 28a and 28b define the second gap δ between the disc 1 and the outer pad 14 so as to allow the caliper 5 to move to return in one direction by the second length $L_2$ when the brake is released. Each of the elastic members 28a and 28b is formed annularly wherein the outer periphery portion of each elastic member 28a can be retained by the inner periphery portion of the single elastic member 28b in a given width. Slits 28c and 28d are defined on the elastic members 28a and elastic member 28b circumferentially in a given interval so that the elastic members 28a and 28b can be easily deformed. Accordingly, the elastic members 28a and 28b are elastically deformed between the slits 28c and 28d.

Each interval between the elastic members 28a is set in such a way that one of the elastic members 28a is always retained by the other elastic member 28b when the brake is applied, and amount of moving of the caliper 5 to return to an original position (hereinafter referred to as return moving amount) involved in retaining of the elastic member 28a by the other elastic member 28b, namely, the second length $L_2$ which is the elastic restoration amount of the elastic members 28a and 28b is smaller than the first length $L_1$ which is the elastic restoration amount of the seal ring 12 regardless of the wearing amount of the outer pad 14 when the brake is released, and it is set to be one fifth to four fifths of the first length $L_1$ and is preferable to be set to be about the half of the first length $L_1$.

With the arrangement of the second embodiment, when the brake is applied, the caliper 5 is moved in the other direction by repulsive force which is generated when the inner pad 10 is pressed against the disc 1 so that the outer pad 14 is pressed against the other side surface of the disc 1. During the movement of the caliper 5, each hole 15a floats with respect to each pin 16 and the elastic members 28a and 28b are elastically deformed by the second length $L_2$ as shown in FIG. 8. When the outer pad 14 is worn by an amount exceeding a given amount, the relative moving amount between the pin 16 and the hole 15a becomes large exceeding a given amount so that the elastic member 28b gets over one of the elastic members 28a and is moved in the other direction and is retained by the succeeding elastic member 28a. As a result, a retaining position of one elastic member 28b with respect to the other elastic member 28a, namely, each pin 16 is gradually varied depending on the wearing amount of the outer pad 14.

Successively, when the brake is released, the seal ring 12 is elastically restored to so that the piston 8 is moved to return in the other direction by the first length $L_1$ so as to define a gap between the inner pad 10 and one side surface of the disc 1. At the same time, each of the retained elastic members 28a and 28b is elastically restored. As a result, the caliper 5 is moved to return in one direction by the second length $L_2$ so as to define a second gap δ between the outer pad 14 and the disc 1. The second gap δ is equal to the second length $L_2$ which is the elastic restoration amount of the retained elastic members 28a and 28b.

The second length $L_2$ by which the caliper 5 is moved to return when the brake is released is set to be smaller than the first length $L_1$ regardless of the wearing amount of the outer pad 14. When the brake is released, the first gap Δ is surely defined between the inner pad 10 and the disc 1 in a state where the second gap δ is defined between the outer pad 14 and the disc 1, so that the disc 1 is satisfactorily prevented from being dragged in both inner pad 10 and outer pad 14. If the second length $L_2$ is set to be one fifth to four fifths of the first length $L_1$, the first and second gaps Δ and δ are suitably defined to prevent the disc 1 from being dragged in both inner pad 10 and outer pad 14. If the second length $L_2$ is set to be about the half of the first length $L_1$, the first and second gaps Δ and δ are defined by substantially the same length so as to satisfactorily prevent the disc 1 from being dragged in both inner pad 10 and outer pad 14.

If there are provided a plurality of the other elastic members, wherein intervals between the elastic members 28b are the same or different from those of the elastic members 28a, it is also possible to set the return moving amount (second length $L_2$) of the caliper 5 in one direction when the brake is released by a resultant force of the restrained elastic members 28a and 28b. Further, it is possible to allow one of the elastic members 28a and 28b which confronting one another to have high rigidity so as to deform the other elastic member 28b or 28a.

According to the first and second embodiments, although the elastic members 18, elastic members 28a and 28b are disposed between each pin 16 of the support 4 and each ear 15 of the caliper 5, they can be interposed between exclusive members provided between the support 4 and the caliper 5 instead of the each pin 16 and ear 15 for performing the same function as the first and second-embodiments. In this case, even if one elastic member 18 (the elastic members 28a and 28b are paired) is interposed between the support 4 and the caliper 5, it is obtain substantially the same function as those of the first and second embodiments of the invention. Further, even if one direct active type bearing 24 is interposed between the support 4 and the caliper 5, it is also possible to obtain substantially the same function as those of the first and second embodiments, namely, the floating of the caliper 5 with respect to the support 4 can be performed smoothly by one direct active type bearing 24. The present invention is also applicable to a floating caliper-disc type brake wherein the caliper 5 is slidable relative to the groove (at both sides of the caliper 5 in a peripheral direction of the disc 1) of the support 4. In such cases, the elastic member 18, elastic members 28a and 28b are not limited to have annular shapes but they can have a rectangular shape or other shapes.

Figure 10:
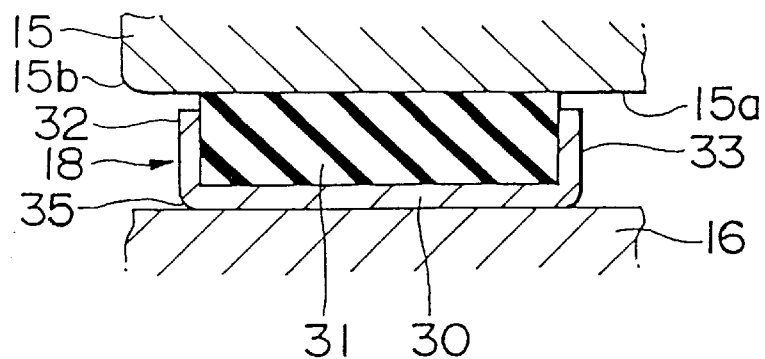
FIG. 10 is a cross-sectional view of an elastic member according to a third embodiment of the present invention.
Figure 11:
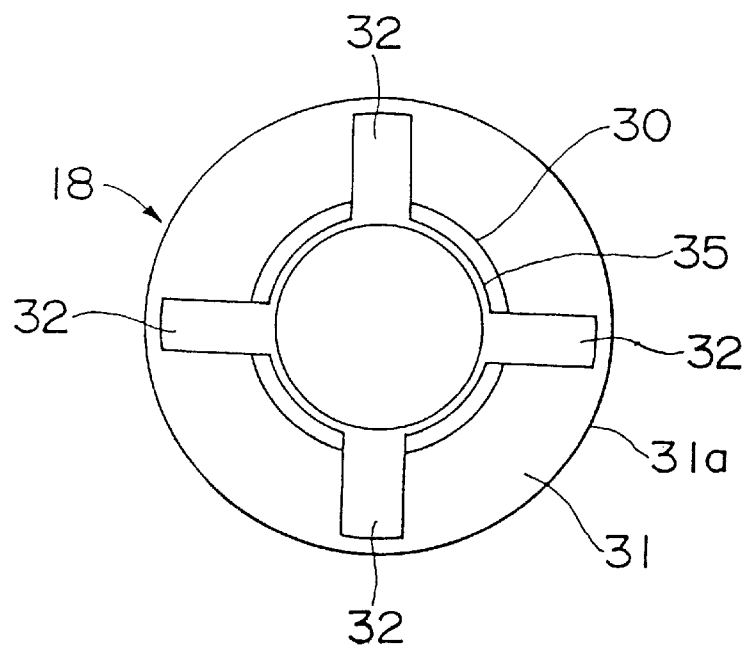
FIG. 11 a view for explaining the elastic member of FIG. 10.

Third Embodiment (FIGS. 10 and 11)

A floating caliper-disc type brake according to a third embodiment showing a second modification of the elastic member will be described with reference to FIG. 10 and 11.

The elastic member 18 comprises an inner cylinder 30 formed of a metallic cylindrical member and an elastic material 31 made of a rubber elastic body which is vulcanized and adhered to the outer peripheral surface of the inner cylinder 30. The inner cylinder 30 includes protruding piece portions 32 and 33 extending radially at a part thereof and tip ends of the protruding piece portions 32 and 33 are positioned at an inner surface of the hole 15a. More in detail, the inner cylinder 30 has the protruding piece portions 32 and 33 at both ends thereof in the direction of a central axis thereof. The protruding piece portion 32 at one end of the inner cylinder 30 is formed at the tip end of a tapered portion 35, which is formed by gradually enlarging one end of the inner cylinder 30 in the diameter of the inner cylinder 30 by bending protruding pieces remained on one end of the inner cylinder 30 in the direction of the outer diameter of the inner cylinder 30. In the second modification, four protruding piece portions 32 are formed circumferentially in the same interval.

The protruding piece portion 33 at the other end of the inner cylinder 30 is formed by bending protruding pieces remained on the other end of the inner cylinder 30 in the direction of the outer diameter of the inner cylinder 30. In the second modification, four protruding piece portions 33 are formed circumferentially in the same interval.

The elastic material 31 may be subjected to vulcanization and adhered to the side surfaces of the protruding piece portions 32 and 33 but a mold release agent may be applied previously to the protruding piece portions 32 and 33 to prevent the elastic material 31 from being vulcanized and adhered to the protruding piece portions 32 and 33 so that they may be formed individually separately from the elastic material 31 so as to be elastically deformed. If the adhesion between the elastic material 31 and the protruding piece portions 32 and 33 is prevented, the elastic deforming force of the elastic material 31 can be maintained constant for a long period of time.

It is possible to subject a surface layer 31a of the circumferential surface of the elastic material 31 forming the elastic close adhering surface (retaining surface) to a process for adjusting a friction coefficient. As such a process, it is general to lower the friction coefficient. For example, the surface layer 31a is cured by heating the surface layer of the elastic material 31 so as to thermally deteriorate it or by applying chemicals on the surface layer 31a so as to deteriorate it.

Such an elastic member 18 may be interposed between the pin 16 of the support 4, namely, between the bush 16b and the ear 15 of the caliper 5 at a position avoiding the direct active type bearing 24. It is also possible to attach a cylindrical bush to the hole 15a of each ear 15 so as to adjust the friction coefficient between the hole 15a and the surface layer 31a of the elastic material 31, whereby the inner peripheral surface of each hole 15a can be formed by the bush. At that time, if the elastic member 18 is pressed into and fixed to each pin 16 of the support 4, each bush 16b of each pin 16 can be omitted.

Firstly, the elastic member 18 is pressed into and fixed to each pin 16 of the support 4. At this time, the elastic member 18 is pressed into each pin 16 from one end side of the inner cylinder 30. Since the tapered portion 35 is formed at one end of the inner cylinder 30, the pin 16 is received easily from one end of the inner cylinder 30 so as to press the elastic member 18 into each pin 16. Since the protruding piece portion 33 is formed at the other end of the inner cylinder 30, the elastic member 18 can be easily pressed into the pin 16 by putting a jig to each protruding piece portion 33.

Each pin 16 is inserted into each hole 15a of the caliper 5 while slightly compressing the elastic material 31 in a state where the elastic member 18 is pressed into each pin 16 of the support 4 at a given position thereof. At this time, the circumferential portion of the elastic material 31 strikes against an insertion side end of the hole 15a of the caliper 5 so that the elastic material 31 is liable to be damaged. To prevent such damage, a chamfering portion 15b is previously formed at the peripheral edge of the insertion side end of the hole 15a as shown in FIG. 10. Accordingly, the elastic material 31 is guided along the chamfering portion 15b at the surface thereof, and it is inserted into the hole 15a while it is compressed gradually. As a result, the elastic material 31 can be elastically compressed by a given amount without being damaged, and can be retained by the hole 15a.

Since the inner cylinder 30 is pressed into and fixed to each pin 16 in a state where the elastic member 18 is mounted between each pin 16 of the support 4 and each hole 15a of the caliper 5, the elastic member 18 is not moved with respect to each pin 16 when the brake is applied. The protruding piece portions 32 and 33 define slight gaps between them and the inner surface of each hole 15a or slidably contact the inner surface of each hole 15a. When the brake is applied, the hole 15a of the caliper 5 is moved with respect to each pin 16 so that the elastic material 31 of each elastic member 18 is elastically deformed by the second length $L_2$ in the same way as the first embodiments as shown in FIG. 6. The elastic deformation of the elastic member 18 by the second length $L_2$ is caused by a friction force between the elastic material 31 and the inner surface of each hole 15a. At that time, the protruding piece portions 32 and 33 are also elastically deformed appropriately.

If the outer pad 14 is worn by an amount exceeding a given wearing amount, the caliper 5 is moved in the other direction with respect to each elastic member 18 so that the close retaining position of the elastic material 31 of each elastic member 18 with respect to each hole 15a is gradually varied depending on the wearing amount of the outer pad 14. At that time, the elastic deforming amount of the elastic material 31 by the second length $L_2$ can be precisely determined by increasing or decreasing, namely, adjusting the friction force generated between the elastic material 31 and the inner surface of each hole 15a in the manner of adjusting the friction coefficient between the elastic material 31 and the inner surface of the hole 15a.

Successively, if the brake is released, the elastic material 31 of each elastic member 18 and the protruding piece portions 32 and 33 are elastically restored. As a result, the caliper 5 is moved to return in one direction by the second length $L_2$ so as to define the second gap δ between the outer pad 14 and the disc 1. The second gap 8 is equal to the second length $L_2$ which is the elastic restoration amounts of the elastic material 31 of the elastic member 18 and that of the protruding piece portions 32 and 33. The elastic restoration force of the elastic material 31 can be adjusted by appropriately selecting elastic coefficient, hardness, length in the central axial direction, thickness in the radial direction, etc. of the elastic material 31.

Each of the protruding piece portions 32 and 33 provided at both ends of the inner cylinder 30 defines a slight gap between it and the inner surface of each hole 15a or slidably contacts the inner surface of each hole 15a. Accordingly, when the caliper 5 is largely moved vertically relative to the vehicle accompanied by bound or rebound of the vehicle during traveling of the vehicle, each of the protruding piece portions 32 and 33 are brought into contact with the inner surface of each hole 15a so as to restrain the caliper 5 from being moved relative to the pin 16. As a result, it is possible to restrain a part of the elastic material 31 (mainly an upper end portion thereof when mounted on the vehicle) from being deformed excessibly, and also possible to satisfactorily restrain the elastic material 31 from being plastically deformed early. Accordingly, each of the protruding piece portions 32 and 33 may be formed on the elastic material 31 only at a portion where the elastic material 31 is easily plastically deformed (an upper end portion of the elastic material 31 when mounted on the vehicle).

Since the returning movement of the caliper 5 by the second length $L_2$ is determined by the elastic material 31 and the excessive deformation of the elastic material 31 in the radial direction is restrained by each of the protruding piece portions 32 and 33, the direct active type bearing 24 can be omitted. Further, the same function can be obtained even if the former is replaced by the latter, and the metallic outer cylinder is pressed into and fixed to the hole 15a of the ear 15, and then the inner peripheral surface of the elastic material composed of rubber elastic body which is subjected to vulcanization and adhered to the inner peripheral surface of the metallic cylinder is elastically brought into contact with each pin 16.

Figure 12:
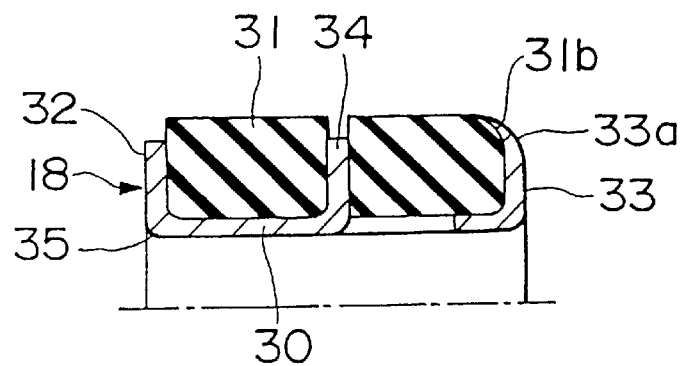
FIG. 12 is a cross-sectional view showing a half of an elastic member according to a modification of the third embodiment of the present invention.

FIG. 12 shows a modification of the structure of the elastic member of the third embodiment.

The inner cylinder 30 includes protruding piece portions 32 and 33, and a protruding piece portion 34 wherein a curved portion 33a is formed on an outer diameter portion of the protruding piece portion 33. The protruding piece portion 34 is formed by cutting (in a shape not forming a straight line such as an M-shape, U-shape, V-shape) a part of the inner cylinder 30 (a middle portion in a central axial direction), and erecting the cut portion in a direction of the outer diameter thereof, wherein the height of the erected portion, i.e. protruding piece portion 34 in a radial direction is the same as those of the protruding piece portions 32 and 33 of the second modification as illustrated in FIGS. 10 and 11. A plurality of protruding piece portion 34 may be formed in a central axial direction or circumferentially. The curved portion 33a provided at the protruding piece portion 33 is formed by bending the outer peripheral portion of the protruding piece portion 33 toward the elastic material 31, and it is slightly longer in a radial direction (substantially the same as the outer diameter of the elastic material 31 when it is not compressed as shown in FIG. 12), and further it is elastically pressed against a tapered portion 31b formed on the outer peripheral portion of the elastic material 31.

According to this modification, the curved portion 33a contacts a peripheral edge of the insertion side end of the hole 15a of the ear 15 and the elastic material 31 is inserted into the hole 15a while the protruding piece portion 33 and the tapered portion 31b are elastically reduced in height in a radial direction. Accordingly, the elastic material 31 can be inserted into the hole 15a without being scarcely damaged while it is compressed elastically in a given amount. As a result, the chamfering portion 15b of the ear 15 as shown in FIG. 10 can be omitted. The protruding piece portion 34 provided on the middle portion of the inner cylinder 30 in the central axial line thereof can function in the same way as the protruding piece portions 32 and 33 of the second modification as shown in FIGS. 10 and 11.

Figure 13:
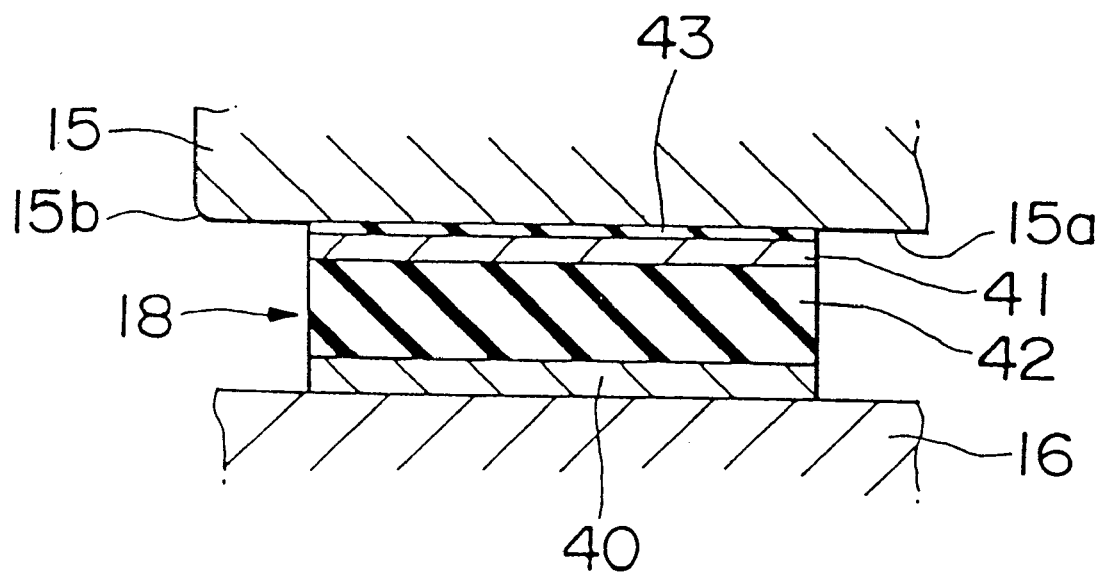
FIG. 13 is a cross-sectional view of an elastic member according to a fourth embodiment of the present invention.
Figure 14:
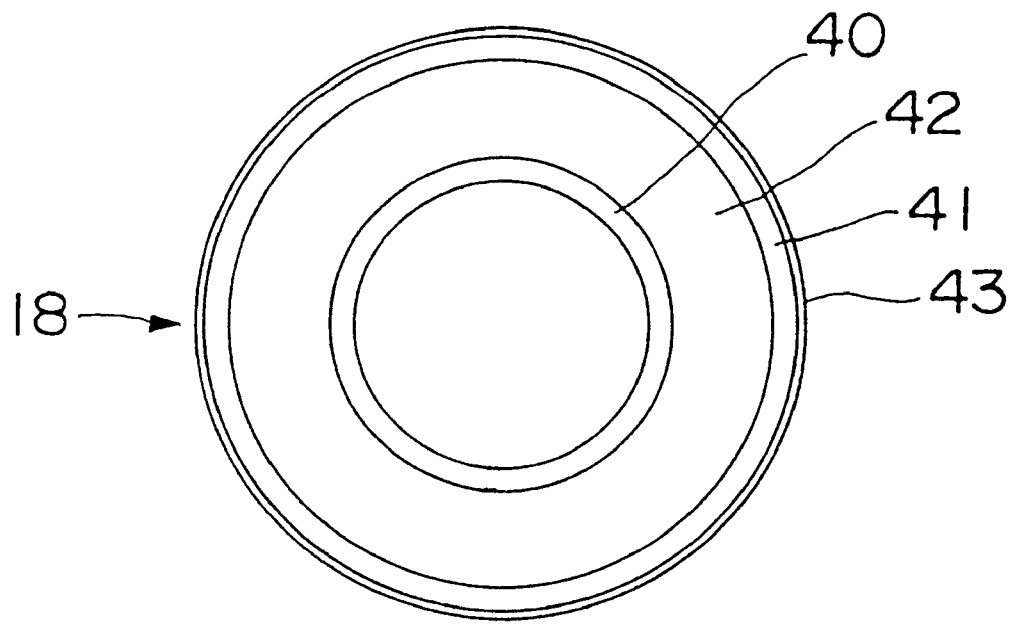
FIG. 14 is a view for explaining the elastic member of FIG. 13.

Fourth Embodiment (FIGS. 13 and 14)

A floating caliper-disc type brake according to a fourth embodiment showing a third modification of the elastic member will be described with reference to FIGS. 13 and 14.

The elastic member 18 comprises a metallic inner cylinder 40, a metallic outer cylinder 41, a main elastic material 42 serving as inner elastic material composed of rubber elastic body which is subjected to vulcanization and adhered between an outer peripheral surface of the inner cylinder 40 and an inner peripheral surface of the outer cylinder 41, and an auxiliary elastic material 43 composed of rubber elastic body which is subjected to vulcanization and adhered to an outer periphery of the outer cylinder 41. The outer cylinder 41 can be contracted or the inner cylinder 40 can be expanded after vulcanization of the rubber elastic body so as to prevent the residual stress from being generated inside the main elastic material 42 to thereby weaken the adhesion owing to shrinkage after vulcanization of the rubber elastic body. It is possible to press the main elastic material 42 into a space between the inner cylinder 40 and the outer cylinder 41 while the main elastic material 42 is not adhered to at least one of the inner cylinder 40 and outer cylinder 41.

The main elastic material 42 has a main function to be deformed by the second length $L_2$ when the brake is applied and to allow the caliper 5 to move to return in one direction by the second length $L_2$ when the brake is released. To assure the main function of the main elastic material 42, the elastic restoration force of the main elastic material 42 can be adjusted by appropriately selecting elastic coefficient, hardness, length in the central axial direction, thickness in the radial direction, etc. of the main elastic material 42.

The auxiliary elastic material 43 contacts the inner peripheral surface of the hole 15a of each ear 15 with a given friction force and has a main function to elastically deform the main elastic material 42 by the second length $L_2$ when the brake is applied. Whereupon, the auxiliary elastic material 43 is formed thin (thickness of 1 mm or less) on the surface of the outer cylinder 41 and made of a rubber elastic body having a given hardness so as to generate friction force between it and the inner surface of each hole 15a of the caliper 5.

The elastic member 18 is assembled in the manner that the inner cylinder 40 is pressed into and fixed to each pin 16 of the support 4, then the auxiliary elastic material 43 is elastically brought into close contact with or retained by the inner peripheral surface of the hole 15a of the ear 15. It is possible to form a tapered portion, like the tapered portion 35 in the third embodiment, on one end of the inner cylinder 40 to facilitate the pressing operation of the inner cylinder 40 into each pin 16. Further, it is possible to form the same tapered portion 15b as the third embodiment on the insertion side end of the hole 15a of the caliper 5 to facilitate the inserting operation of each pin 16 into the hole 15a of the caliper 5. When the elastic member 18 is inserted into the hole 15a of the caliper 5, the main elastic material 42 interposed between the inner cylinder 40 and the outer cylinder 41 is not deformed and only the auxiliary elastic material 43 is compressed.

Since the inner cylinder 40 is pressed into and fixed to each pin 16 of the support 4, each elastic member 18 is not moved with respect to each pin 16 when the brake is applied. Further, the auxiliary elastic material 43 is elastically brought into contact with the inner surface of the hole 15a of the caliper 5.

Since the hole 15a of the caliper 5 is moved with respect to each pin 16 when the brake is applied, mainly the main elastic material 42 is elastically deformed by the second length $L_2$ as shown in FIG. 6 owing to the friction force between the auxiliary elastic material 43 and the inner surface of each hole 15a. Since the auxiliary elastic material 43 is thin, it is scarcely moved in the central axial direction thereof. Accordingly, it is possible to precisely generate the elastic deforming amount by the second length $L_2$ in the main elastic material 42 by adjusting the friction coefficient of the auxiliary elastic material 43 (or the bush attached to the inner periphery of the hole 15a to which the auxiliary elastic material 43 is elastically brought into contact). As mentioned above, since the auxiliary elastic material 43 has a main function to contact the peripheral surface of the hole 15a to generate a precise friction force, it can be made of a rubber elastic body having a given hardness and formed separately from the main elastic material 42, thereby generating the precise friction force. Accordingly, it is possible to allow the elastic member 18 to have an arbitrary length in the central axial direction and allow the auxiliary elastic material 43 to directly contact the inner surface of the hole 15a of the metallic caliper 5. It is possible to attach a bearing alloy on the inner surface of the hole 15a of the caliper 5 by plating so as to adjust the friction coefficient, namely, to increase or decrease the friction coefficient between the auxiliary elastic material 43 and the inner surface of each hole 15a.

As mentioned above, the main elastic material 42 and the auxiliary elastic material 43 are respectively made of separate members adapted for performing their own functions. Further, when the brake is applied, it is possible to elastically deform the main elastic material 42 by the second length $L_2$ as shown in FIG. 6 owing to the friction force generated between the auxiliary elastic material 43 and the inner surface of each hole 15a. If the outer pad 14 is worn by an amount exceeding a given amount, the auxiliary elastic material 43 is slid with respect to the inner surface of each hole 15a while the elastic deforming amount of the main elastic material 42 is maintained by the second length $L_2$, thereby gradually varying the retaining position of the auxiliary elastic material 43 with respect to the inner surface of each hole 15a depending on the wearing amount of the outer pad 14. When the brake is released, the main elastic material 42 is elastically restored, thereby moving the caliper 5 to return by the second length $L_2$ so as to define the second gap δ between the outer pad 14 and the disc 1.

When the caliper 5 is largely moved vertically relative to the vehicle accompanied by bound or rebound of the vehicle during traveling of the vehicle, the interval between the inner and outer cylinders 40 and 41 is varied. However, since the main elastic material 42 is inserted between the inner and outer cylinders 40 and 41, the spring constant in the direction perpendicular to the central axis (in a radial direction) is greater than that in the central axial direction so that the variation of the interval between the inner and outer cylinders 40 and 41 is satisfactorily restrained as an entire elastic deformation of the main elastic material 42. As a result, a part of the main elastic material 42 (mainly an upper end portion thereof when mounted on the vehicle) is restrained from being deformed excessively in the radial direction so that the main elastic material 42 is satisfactorily restrained from being plastically deformed early. Since the auxiliary elastic material 43 has a given hardness and thin thickness, even if permanent set in fatigue is generated in a part thereof (mainly an upper end portion thereof when mounted on the vehicle), the close contact between the auxiliary elastic material 43 and the inner surface of the hole 15a of the caliper 5 can be maintained satisfactorily as a whole.

As mentioned above, since the returning movement of the caliper 5 by the second length $L_2$ is performed by the main elastic material 42 and the excessive deformation of the main elastic material 42 in the radial direction is restrained by the operation of the inner and outer cylinders 40 and 41, the direct active type bearing 24 interposed between the bush 16b and the hole 15a can be omitted. Further, if the bush having a given friction force is attached to the hole 15a and the outer cylinder 41 is slidably retained by the bush in a given friction force, the auxiliary elastic material 43 can be omitted. The same function can be obtained if the auxiliary elastic material 43 is subjected to vulcanization and adhered to the inner cylinder 40 and the outer cylinder 41 is pressed into and fixed to the hole 15a of the caliper 5 wherein the auxiliary elastic material 43 is elastically brought into contact with each pin 16.

In the third and fourth embodiments, each elastic member 18 is disposed between each pin 16 of the support 4 and the ear 15 of the caliper 5. However, single or plural elastic members 18 can be disposed between exclusive members, which are separately formed the pin 16 and ear 15, instead of each pin 16 and ear 15, thereby obtaining the same function as those of the aforementioned embodiment.

In the second modification of the elastic member 18 as shown in FIGS. 10 and 11, the elastic member 18 is mounted between each pin 16 of the support 4 and each ear 15. However, even if a pair of pins integrated with the caliper 5 are provided and a pair of holes are provided in the support 4, the inner cylinder 30 is pressed into and fixed to one of pins integrated with the caliper 5 or holes of the support 4, and the elastic material 31 is slidably brought into contact with the other of pins integrated with the caliper 5 or the holes of the support 4 respectively in a given friction force, the same function can be obtained.

Still Further, in the third modification of the elastic member 18 as shown in FIGS. 13 and 14, the elastic member 18 is mounted between each pin 16 of the support 4 and each hole 15a of the caliper 5. However, even if the elastic member 18 is mounted between a pin integrated with the caliper 5 and a hole of the support 4, the same function can be obtained.

With the arrangement of the floating caliper-disc type brake of the present invention as mentioned above, the gap is surely defined between the disc and both pads when the brake is released. As a result, during the traveling of the vehicle, the outer pad can be prevented from being always slid with respect to the disc, thereby preventing the outer pad from generating dragging torque therein. Consequently, it is possible to improve fuel consumption and to solve a different noise (jar) which occurred when the outer pad is slid with respect to the disc so as to conspicuously improve utility value of the disc brake. The more the accuracy of the manufacturing accuracy and attaching accuracy of the disc is enhanced and the more the disk is not kicked back into the outer pad, the more such an effect can be obtained.

What is claimed is:

1. A floating caliper-disc type brake which is mountable on a vehicle for braking a rotatable wheel having a disc, said disc brake comprising:

a support fixed to a non-rotatable portion of a vehicle;

a caliper which is floatably mounted to said support for braking, one of said support and said caliper including a plurality of bores and the other of said support and said caliper including a plurality of pins, each said pin being floatably received in a respective one of said bores such that said caliper is movable relative to said support; and at least one elastic member disposed between opposing engagement portions of one of said pins and a respective one of said bores, said elastic member comprising metallic inner and outer cylinders which are connected radially with each other by a main elastic material extending radially therebetween, one of said inner and outer cylinders being pressed into and fixed to one of said engagement portions, and the other of said inner and outer cylinders being in contact with the other of said engagement portions.

2. The disc brake according to claim 1, wherein said other of said inner and outer cylinders includes a peripheral surface which faces radially away from said main elastic material, said elastic member further comprising an auxiliary elastic material adhered to said peripheral surface which is in contact with said other of said engagement portions.

3. The disc brake according to claim 2, wherein said caliper is movable in an axial direction defined by sliding of said pins within said bores, said main elastic material being elastically deformable in said axial direction.

4. The disc brake according to claim 3, wherein said auxiliary elastic material generates a friction force with said other of said engagement portions.

5. The disc brake according to claim 1, wherein a plurality of said elastic members are disposed between said engagement portions of one said bore and one said pin.

6. A floating caliper-disc type brake comprising a support fixed to a non-rotatable portion of a vehicle, a caliper floatably supported by said support and having rear and front arms, an inner pad to be pushed by a piston, said piston being slidably engaged in a cylinder formed in said rear arm of said caliper, an outer pad supported by said front arm of said caliper, at least one seal ring interposed between said cylinder and said piston in a retaining position, said seal ring being gradually varied in said retaining position depending on a wearing amount of said inner and outer pads, wherein when said brake is applied, said piston is pushed out from said cylinder in one direction while elastically deforming said seal ring within a deformable amount of said seal ring, and said caliper is moved to the other direction with respect to said support, so that said inner and outer pads clamp a disc rotating together with a wheel so as to generate braking torque, and wherein when said brake is released, said piston is moved a first length in the other direction into said cylinder owing to elastic deformation of said seal ring so as to define a gap between said disc and said inner pad; and at least one elastic member interposed in a retaining position between opposing surfaces of said support and said caliper which extend in respective floating directions, said elastic member being gradually varied in said retaining position depending on a wearing amount of said outer pad, wherein when said brake is applied, said caliper is moved in said other direction while elastically deforming said elastic member within a deformable amount of said elastic member, said elastic member being gradually movable along one of said opposing surfaces in said respective floating direction to vary said retaining position of said elastic member when said elastic member is deformed said deformable amount and wherein when said brake is released, said caliper is returned in said one direction by a second length which is smaller than said first length in response to elastic restoration of said elastic member so as to define a first gap between said disc and said inner pad and a second gap between said disc and said outer pad, said elastic member being structured by adhering an elastic material to a first metallic member which is fixed to one of said support and said caliper by pressed contact.

7. The floating caliper-disc type brake according to claim 6, further comprising at least one direct active type bearing interposed between said support and said caliper for supporting floating movement of said caliper.

8. A floating caliper-type brake assembly for mounting on a vehicle for applying a braking torque upon a disc of a wheel, the brake assembly comprising:

a support member fixed to a non-rotatable portion of a vehicle and having at least one support engagement portion;

a caliper having at least one caliper engagement portion floatably engaged with said support engagement portion so that said caliper is movable relative to said support member in opposite first and second directions, said caliper including first and second arms which are connected together, said first arm defining a piston-receiving cylinder;

a piston for actuating said brake assembly which is movably engaged in said cylinder so as to be movable relative to said caliper;

first and second brake pads disposed respectively on said first and second arms of said caliper in opposing relation for braking, said second brake pad being connected to said second arm, said first brake pad being connected to said piston so as to move in said first direction towards said second brake pad in response to movement of said piston and to effect a corresponding movement of said second arm in said second direction toward said first brake pad;

at least one seal member coacting between said cylinder and said piston to bias said piston to a release position, said seal member being connected between a position on one of said cylinder and said piston and to a retaining position on the other of said cylinder and said piston, said seal member being elastically deformable within a deformable amount so that said piston is movable in said first direction to a braking position when actuated and in said second direction to said release position in response to elastic restoration of said seal member, said other of said cylinder and said piston being displaceable relative to said seal member once deformed by said deformable amount so that said retaining position is varied in response to wear of said first and second brake pads; and at least one ring-like elastic member coacting between said engagement portions of said support member and said caliper to bias said caliper to a release position, said elastic member extending radially between opposing inner and outer peripheral surfaces of said engagement portions which extend generally in said first and second directions, said elastic member having a first part which is fixedly connected to a fixed position on one of said engagement portions by a fixed connection and a second part which is releasably connected to a retaining position on the other of said engagement portions by a releasable connection, said elastic member being elastically deformable within a deformable amount so that said caliper is movable in said second direction away from said release position to a braking position and in said first direction to said release position in response to elastic restoration of said elastic member, said releasable connection permitting continued movement of said caliper in said second direction once said elastic member is deformed said deformable amount such that said second part of said elastic member is movable along said other of said engagement portions to vary said retaining position in response to wear of said second brake pad, said elastic member being structured by adhering an elastic material to a first metallic member which is fixed to one of said support and said caliper by pressed contact.

9. The brake assembly according to claim 8, wherein one of said engagement portions comprises a bore and the other of said engagement portions comprises an elongate pin floatably received within said bore, said elastic member being connected to said outer peripheral surface which is defined by said pin and said inner peripheral surface which is defined by said bore.

10. The brake assembly according to claim 9, wherein said elastic material is an elastomeric annular ring.

11. The brake assembly according to claim 8, wherein a plurality of said elastic members are provided between said engagement portions of said caliper and said support member.

12. The brake assembly according to claim 8, further comprising at least one direct active type bearing interposed between said engagement portions of said support member and said caliper for supporting floating movement of said caliper.

13. The brake assembly according to claim 8, wherein said first metallic piece defines said first part and said elastic material defines said second part, said second part of said elastic body being in frictional contact with said other of said engagement portions to define said releasable connection.

14. The brake assembly according to claim 8, wherein said elastic member comprises said first metallic piece which defines said first part, a second metallic piece which defines said second part and an elastic body defined by said elastic material which joins said first and second metallic pieces and is elastically deformable to permit relative movement therebetween.

15. The brake assembly according to claim 14, wherein said second metallic piece includes an elastic material which frictionally contacts said other of said engagement portions.

16. A floating caliper-disc type brake which is mountable on a vehicle for braking a rotatable wheel having a disc, said disc brake comprising:

a support fixed to a non-rotatable portion of a vehicle;

a caliper which is floatably mounted to said support for braking, one of said support and said caliper including a plurality of bores and the other of said support and said caliper including a plurality of pins, each said pin being floatably received in a respective one of said bores such that said caliper is movable relative to said support; and at least one elastic member disposed between opposing engagement portions of one of said pins and a respective one of said bores, said elastic member comprising a metallic cylindrical member having outer and inner peripheral surfaces and an elastic material secured to a peripheral side surface defined by one of said inner and outer peripheral surfaces, said cylindrical member being pressed and fixed to one of said engagement portions of said pin and said respective bore, said elastic material being in contact with the other of said engagement portions of said pin and said bore.

17. The disc brake according to claim 16, wherein said cylindrical member includes at least one protruding portion which extends radially away from said peripheral side surface, said at least one protruding portion including a tip end which is positioned adjacent to said other of said engagement portions.

18. The disc brake according to claim 16, wherein said elastic material is elastically deformable so as to deform up to a deformable amount as said caliper is moved relative to said support, said contact between said elastic material and said other of said engagement portions being releasable when deformed by said deformable amount so as to permit sliding of said elastic material along said other of said engagement portions.

19. The disc brake according to claim 18, wherein said elastic member is annular and extends radially between said engagement portions of said pin and said bore.

20. The disc brake according to claim 16, wherein each of said pins includes a plurality of said elastic members.

* * * * *